United States Patent
Sasaki et al.

(10) Patent No.: US 8,056,388 B2
(45) Date of Patent: Nov. 15, 2011

(54) POINTER INSTRUMENT

(75) Inventors: Katsuhiro Sasaki, Niigata (JP); Satoshi Kobayashi, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 540 days.

(21) Appl. No.: 12/306,845

(22) PCT Filed: Jun. 19, 2007

(86) PCT No.: PCT/JP2007/062279
§ 371 (c)(1),
(2), (4) Date: Dec. 29, 2008

(87) PCT Pub. No.: WO2008/001642
PCT Pub. Date: Jan. 3, 2008

(65) Prior Publication Data
US 2009/0277373 A1  Nov. 12, 2009

(30) Foreign Application Priority Data

Jun. 29, 2006  (JP) .................................. 2006-178921

(51) Int. Cl.
*G01P 21/00*  (2006.01)
(52) U.S. Cl. ........................................................ 73/1.37
(58) Field of Classification Search ......................... None
See application file for complete search history.

(56) References Cited

U.S. PATENT DOCUMENTS

| | | | |
|---|---|---|---|
| 5,469,137 A | 11/1995 | Muto | |
| 2006/0144172 A1 | 7/2006 | Sasaki | |

FOREIGN PATENT DOCUMENTS

| | | |
|---|---|---|
| JP | 4-123498 | 11/1992 |
| JP | 06-129877 | 5/1994 |
| JP | 2001-314099 | 11/2001 |
| JP | 2003-130694 | 5/2003 |
| JP | 2006-064437 | 3/2006 |

*Primary Examiner* — Robert R Raevis
(74) *Attorney, Agent, or Firm* — McDermott Will & Emery LLP

(57) ABSTRACT

A pointer measuring instrument capable of indicating "zero" on an indication panel by a pointer even if a play (backlash) is present in gears. The measuring instrument comprises a pointer reference position setting means (7a, 7b) for determining the reference position of the pointer (4). A control means (6) rotates the pointer (4) in the direction toward the reference position when a power supply to a stepping motor (2) is turned on, and performs a first drive for stopping the rotation of the pointer (4) when it receives a pointer reference position arrival signal from the pointer reference position setting means (7a). Then, the control means performs a second drive for moving the pointer (4) by a first angle from the reference position in the reverse direction away from the reference position, and performs a third drive for rotating the gear (3S) of a reduction mechanism (3) on the stepping motor (2) side by a second angle.

5 Claims, 5 Drawing Sheets (a)

(b)

(c)

(b)

(c)

POINTER INSTRUMENT

RELATED APPLICATIONS

This application is the U.S. National Phase under 35 U.S.C. §371 of International Application No. PCT/JP2007/062279, filed on Jun. 19, 2007, which in turn claims the benefit of Japanese Application No. 2006-178921, filed on Jun. 29, 2006, the disclosures of which Applications are incorporated by reference herein.

TECHNICAL FIELD

The present invention refers to a pointer instrument using a stepping motor, which is used as an instrument movement of digital control for an alternative of an ammeter including a moving coil or cross coil magnet rotor. For example, the magnet measures and indicates the measured amount such as a travel speed or engine speed for a vehicle based on the frequency signal input that is proportional to the measured amount.

BACKGROUND ART

Generally, the pointer instrument using the stepping motor is configured such that a rotation of the stepping motor is transmitted to a pointer using a speed-reduction mechanism including a plurality of gears, and accordingly the pointer indicates travel speed or engine speed.

In a case when a stepping motor is used as an instrument movement, unlike a vector follow-up method in which a magnet rotor follows in a synthesized-vector direction of a coil magnet field as in a cross coil instrument, variation of input signals are obtained in a certain period, and the motor is step-driven by an angle corresponding to the variation in many cases. A magnetic pole of a magnet rotor is subjected to micro-step processing performed in each step of a comb-like toothed yoke or in each interval between those steps so that the magnet rotor is driven. Therefore, in a typical configuration, a position of the magnet rotor in a situation when a power switch is turned on is assumed as an initial value (in a pointer instrument, zero initialization is performed, for example, by forcibly returning the rotor position to a zero position on a dial plate), and the motor is step-driven by an angle corresponding to a increase or decrease in input signal from the zero position.

Therefore, mechanical error may occur on the magnet rotor due to external vibration applied to a measuring instrument, which leads to a possibility that the magnet rotor is displaced from the precise angular position, which is established by drive control using step drive, that is, the magnet rotor strays from a precise position between the comb-like toothed yoke and the magnetic pole of the magnet rotor, resulting in an angular displacement by an angle corresponding to one step. Once such angular displacement so-called loss of synchronous occurs, a pointer cannot indicate the precise angular position, and the pointer is then always positioned at the angular position which includes the error angular due to the loss of synchronous unless the initialization is applied.

The phenomenon of loss of synchronous may not only occur due to the mechanical variation caused by external vibration, but also occur in the case that the magnet rotor cannot follow-up variation in input signal.

In such a stepping-motor instrument, a reset of loss of synchronous is performed to eliminate such pointing errors due to the loss of synchronous as many as possible. To perform the reset of the loss of synchronous, a stopper is mounted on a display board which is to be mounted with the stepping motor. In a measuring instrument that has been proposed, the stopper is protrusively provided at a position where a pointer starts rotation, and when the stepping motor falls into loss of synchronous, a reset-to-zero signal is outputted to the stepping motor so that the pointer is returned to a stopper side, and when the pointer comes into the stopper, reset of loss of synchronous is determined to be completed, and the reset-to-zero signal is stopped.

Patent document 1: JP-A-2001-314099

DISCLOSURE OF THE INVENTION

Problems that the Invention is to Solve

However, in some pointer instrument, not only in the case that a position, at which the pointer comes into contact with the stopper so that rotation is stopped, is a position at which the pointer points a "0" scale on the display board, but also in the case that the stopper is provided at a counterclockwise (left rotation direction) side with respect to the "0" scale from the standpoint of appearance, it has been necessary that the pointer is temporarily rotated counterclockwise so that the pointer comes into contact with the stopper for reset of loss of synchronous, then the pointer is rotated clockwise (right rotation direction) so that the pointer points the "0" scale on the display board. In this case, in a speed-reduction mechanism that transmits rotation of the stepping motor to the pointer, a gear fixed with the pointer engages a gear of the stepping motor in order to clockwise rotate the gear fixed with the pointer. Therefore, the gear fixed with the pointer does not rotate counterclockwise. However, since a backlash exists between gears, the relevant gear may rotate clockwise by an angle corresponding to the backlash.

The backlash sometimes induces a sense of incongruity to a driver. For example, the stepping motor is driven such that the pointer is rotated clockwise from the "0" scale, then the pointer is rotated counterclockwise when the vehicle speed is "0", so that when the pointer points the "0" scale, the pointer points "0" on the display board. Despite such drive, the pointer may have pointed a position being clockwise displaced from "0" on the display board, that is, pointed a value larger than "0" due to the backlash, leading to discomfort to a driver.

Thus, the invention focuses on such a problem, and an object of the invention it to provide a pointer instrument in which even if an allowance (backlash) exists between gears, a pointer may point "0" on a display board.

Means for Solving the Problems

A pointer instrument of the invention has a stepping motor, a pointer driven by rotation of the stepping motor via a speed-reduction mechanism including a plurality of gears, a display board having an index section to be pointed by the pointer, and a control means that drives and controls the stepping motor; wherein pointer reference-position setting means are provided for determining a reference position of the pointer, and when the stepping motor is powered on or off, the control means performs first drive processing where the pointer is rotated in a direction of the reference position, and rotation of the pointer is stopped with input of a pointer reference-position arrival signal from the pointer reference-position setting means, then performs second drive processing where the pointer is moved from the reference position by a first angle in a direction opposite to the reference position direction, and then performs third drive processing where a gear at a side of the stepping motor of the speed-reduction mechanism is moved by a second angle.

In addition, the control means sets an angle corresponding to a backlash, existing between a plurality of gears (reduction gears) configuring the speed-reduction mechanism, as the second angle.

In addition, the pointer reference-position setting means include a detection object for specifying a position of the pointer and a detection section that detects the detection object in a non-contact manner.

In addition, a position of the pointer that has been stopped by the second drive processing is set at a zero pointing scale on the display board.

In addition, the control means is inputted with vehicle speed, and when the vehicle speed is zero, the control means forcibly positions the pointer at a position of the zero pointing scale.

Advantage of the Invention

As hereinbefore, according to the invention, a pointer instrument can be provided, in which even if an allowance (backlash) exists between gears, a pointer may point "0" on a display board.

Figure 1:
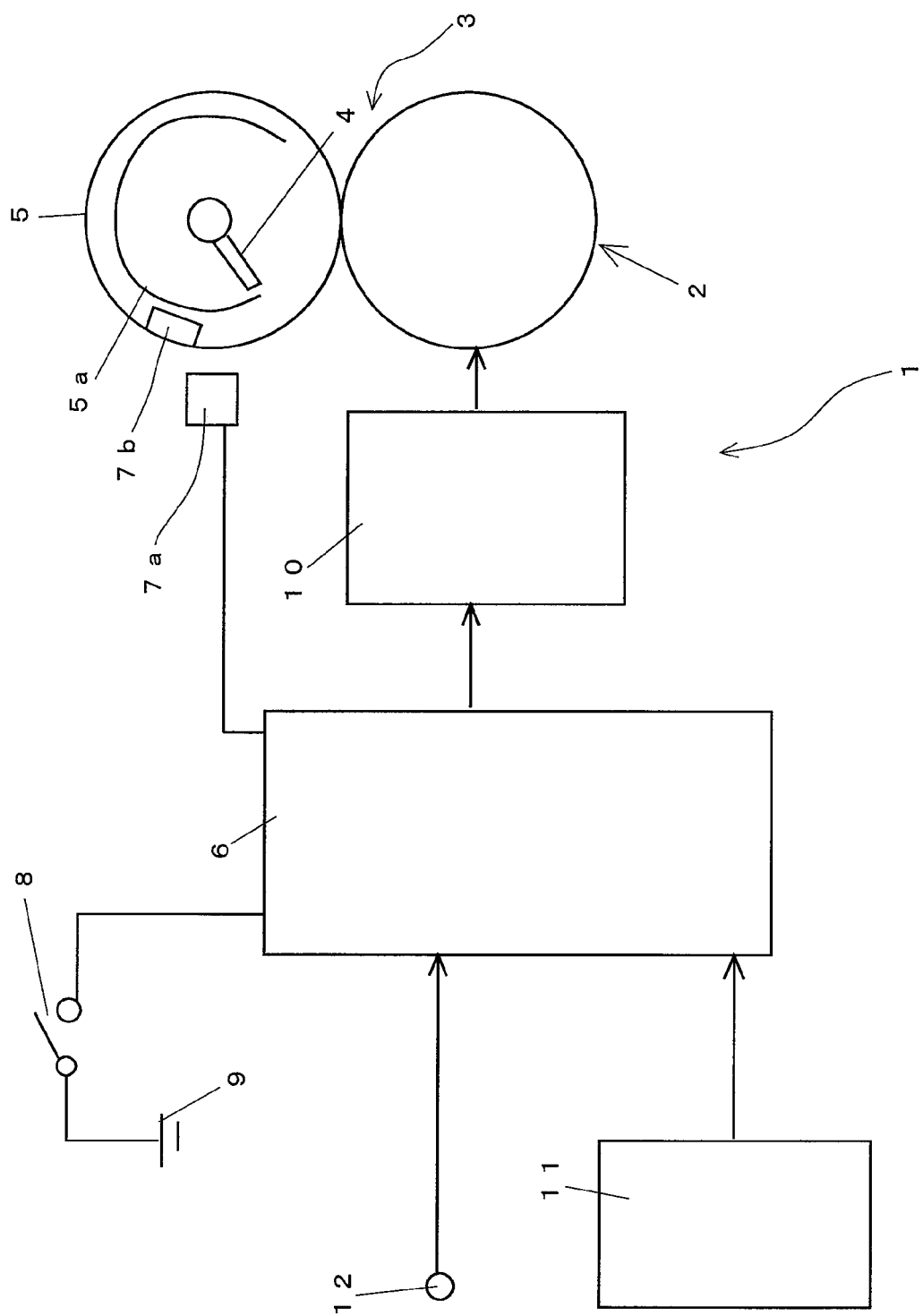
FIG. 1 includes a block diagram showing a first embodiment of the invention.

DESCRIPTION OF THE REFERENCE NUMERALS AND SIGNS 1 pointer instrument
2 stepping motor
3 speed-reduction mechanism
4 pointer
5 display board
5a index section
6 control means
7a detection section (pointer reference-position setting means)
7b detection object (pointer reference-position setting means)
8 power switch
9 power supply
10 output means
11 ROM (memory storage means)
12 input terminal

BEST MODE FOR CARRYING OUT THE INVENTION

A pointer instrument of the invention is a pointer instrument 1 that has a stepping motor 2, a pointer 4 driven by a rotation of the stepping motor 2 via a speed-reduction mechanism 3 including a plurality of gears 3P and 3S, a display board 5 having an index section 5a to be pointed by the pointer 4, and control means 6 that drives and controls the stepping motor 2; wherein pointer reference-position setting means 7a and 7b are provided for determining a reference position of the pointer 4, and when the stepping motor 2 is powered on or off, the control means 6 performs first drive process where the pointer 4 is rotated in a reference position direction, and the rotation of the pointer 4 is stopped with an input of a pointer reference-position arrival signal from the pointer reference-position setting means 7a, then performs second drive process where the pointer 4 is moved from the reference position by a first angle in a direction opposite to the reference position direction, and then performs third drive process where a gear 3S at a stepping motor 2 side of the speed-reduction mechanism 3 is moved by a second angle. By configuring in this way, a pointer instrument 1 can be provided, in which even if an allowance (backlash) exists between the gears 3P and 3S, the pointer 4 is able to indicate a "0" scale on the index section 5a of the display board 5.

In addition, the control means 6 sets an angle corresponding to the backlash, existing between the plurality of gears 3P and 3S (reduction gears) configuring the speed-reduction mechanism 3, as the second angle. By configuring in this way, a pointer instrument 1 can be provided, in which even if an allowance (backlash) exists between the gears 3P and 3S, the pointer 4 is able to indicate a "0" scale on the index section 5a of the display board 5.

In addition, the pointer reference-position setting means 7a and 7b include a detection object 7b for specifying a position of the pointer 4 and a detection section 7a that detects the detection object 7b in a non-contact manner. By configuring in this way, a pointer instrument 1 can be provided, in which even if an allowance (backlash) exists between the gears 3P and 3S, the pointer 4 is able to indicate a "0" scale on the index section 5a of the display board 5. Since the detection section 7a and the detection object 7b are not directly attached to each other, the pointer 4 is able to prevent sound which may be produced when the detection section 7a and the detection object 7b are in contact.

In addition, a position of the pointer 4 that has been stopped by the second drive process is set at a zero pointing scale on the index section 5a of the display board 5. By configuring in this way, a pointer instrument 1 can be provided, in which even if an allowance (backlash) exists between the gears 3P and 3S, the pointer 4 is able to indicate a "0" scale on the index section 5a of the display board 5.

In addition, the control means 6 is inputted with vehicle speed, and when the vehicle speed is zero, the control means forcibly conducts positioning at a zero scale position. By configuring in this way, a pointer instrument 1 can be provided, in which even if an allowance (backlash) exists between the gears 3P and 3S, the pointer 4 is able to indicate a "0" scale on the index section 5a of the display board 5.

Embodiment 1

FIG. 1 shows a basic configuration of the invention and explains it with a vehicle speed meter as an example. A pointer instrument 1 of the invention includes a stepping motor 2, a pointer 4 driven by the stepping motor 2 via a speed-reduction mechanism 3, a display board 5 having an index section 5a to be pointed by the pointer 4, control means 6 that drives and controls the stepping motor 2, a detection section 7a that detects a reference position of the pointer 4, a detection object 7b to be detected by the detection section 7a, and a power supply 9 that supplies power to the control means 6 via a power switch 8. 10 shows output means, which performs appropriate waveform process of a signal from the control means 6, and supplies the processed signal to the stepping motor 2. The number 11 shows ROM (memory storage means). The number 12 shows an input terminal, which is connected with a vehicle speed sensor (not shown) in the embodiment. A frequency signal from the vehicle speed sensor, which is in proportion to travel speed of a vehicle as the measured quantity, is inputted from the input terminal 12 to the control means 6.

The stepping motor 2 has a stator (not shown) having two coils, and a magnet rotor (not shown). The said magnet rotor has a large number of N poles and S poles being alternately magnetized on an outer circumferential face thereof. Rotation of the said magnet rotor is transmitted to the speed-reduction mechanism 3, and the pointer 4 is rotated along with rotation of the speed-reduction mechanism 3.

The speed-reduction mechanism 3 is configured by a plurality of gears in the embodiment. In the figures, only two gears are shown, including a gear 3S that outputs rotation of the magnet rotor at a stepping motor 2 side, and a gear 3P which the pointer 4 is fixed to.

The pointer 4 is fixed to the gear 3P configuring the speed-reduction mechanism 3, and driven by rotation of the stepping motor 2 (the magnet rotor) via the speed-reduction mechanism 3. The gear 3P fixed with the pointer 4 is hard to rotate due to resistance of a guide member (not shown) or the like unless it is driven by the stepping motor 2.

The display board 5 has an index section 5a which is pointed by the pointer 4, and the index section 5a includes at least a scale, and letters corresponding to the scale. Furthermore, numbers on the scale are printed in a way that the number increases as it advances clockwise.

The control means 6 includes a microcomputer that receives a frequency signal corresponding to the measured quantity from the input terminal 12, and outputs the signal corresponding to the measure quantity to the stepping motor 2 to drive the stepping motor.

The detection section 7a detects the detection object 7b in a non-contact manner, and an optical sensor is used for the detection section in the embodiment. The detection object 7b is to be detected by the detection section 7a, and provided on the gear 3P fixed to the pointer 4. A positional relationship between the pointer 4 and the detection object 7b is determined so as to form a predetermined angle between them, so that they are configured such that when the detection object 7b (a boundary between the gear 3P and the detection object 7b) is detected, which position on the display board 5 is indicated by the pointer 4 can be determined. In addition, the detection section and detection object have distinct colors so that the optical sensor which is used for this embodiment is able to differentiate them and detect the detection object 7b. For example, in the embodiment, since the gear 3P is formed using whitish synthetic resin, the detection object 7b is formed with a black printed layer. When gear 3P has a blackish color, the detection object 7b has a whitish color.

The detection section 7a and the detection object 7b collectively configure pointer reference-position setting means that can determine a reference position of the pointer in processing as described later.

In the embodiment, the pointer reference-position setting means 7a and 7b are the detection section 7a consists of the optical sensor and the detection object 7b consists of the printed layer. However, the embodiment is not limitative to it. For example, as means for non-contact detection, magnetic detection means may be used for the detection section 7a, and a magnet or a magnetic material may be used for the detection object 7b. In the case of contact detection, the pointer reference-position setting means may be configured by the pointer 4 and a pointer stopper for stopping rotation of the pointer 4.

In the case of a pointer instrument for automobile, the power switch 8 and the power supply 9 correspond to an ignition key switch 8 and in-vehicle battery 9 respectively. The power is supplied from the in-vehicle battery 9 to the control means 6 through the ignition key switch 8. The control means 6 is configured such that it detects supply of the power though the ignition key switch 8, and performs zero initialization (zero detection process) of the stepping motor 2.

The ROM 11 is a rewritable storage means such as EEPROM. In the embodiment, the ROM stores the data of displacement between the 0 scale on the display board 5 and a position indicated by the pointer 4 when the detection section 7a detects the detection object 7b. Moreover, the ROM stores data of an output angle is passing through a control initial, the data corresponding to data of a measurement signal of input vehicle speed.

Figure 2:
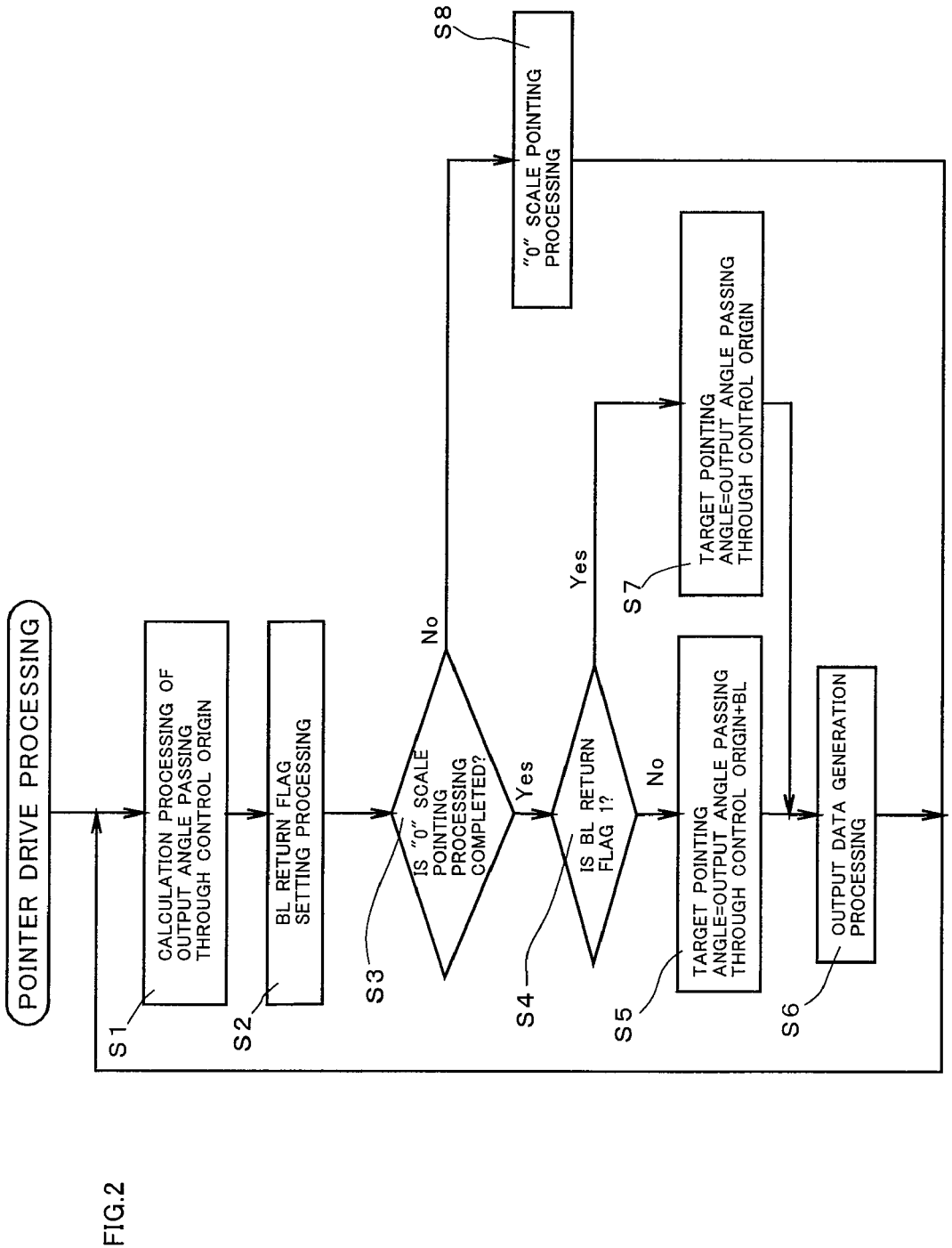
FIG. 2 includes a flowchart diagram showing reset process of loss of synchronous in the embodiment.
Figure 3:
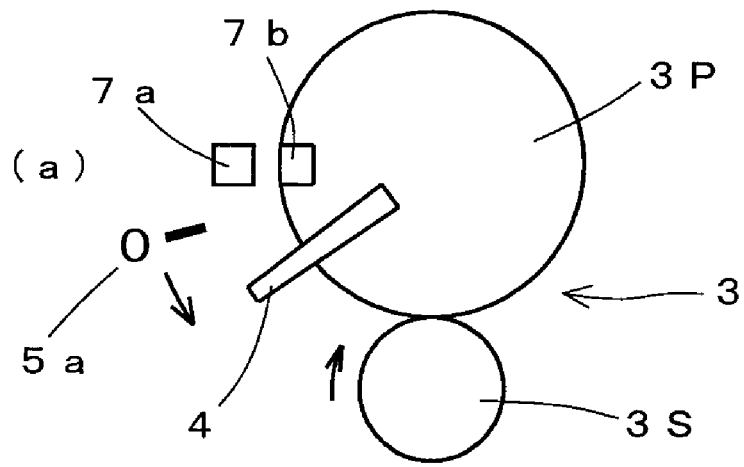
FIG. 3 includes explanatory pictures showing motions of a stepping motor and a pointer in the embodiment.
Figure 3:
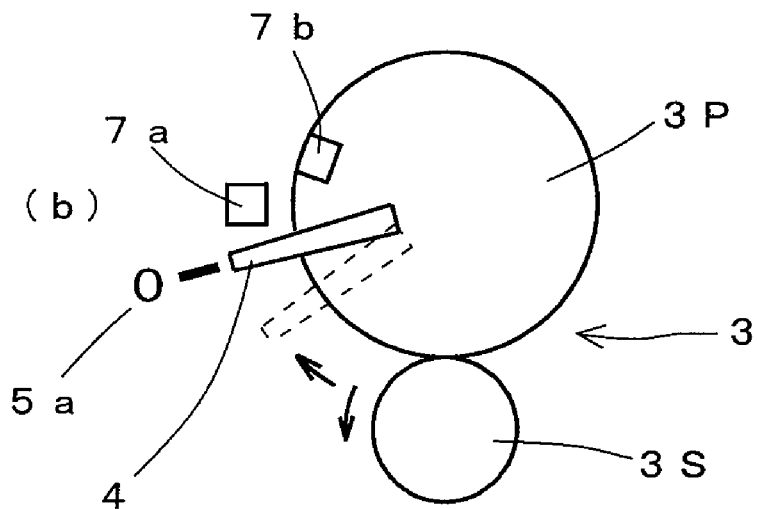
Figure 3:
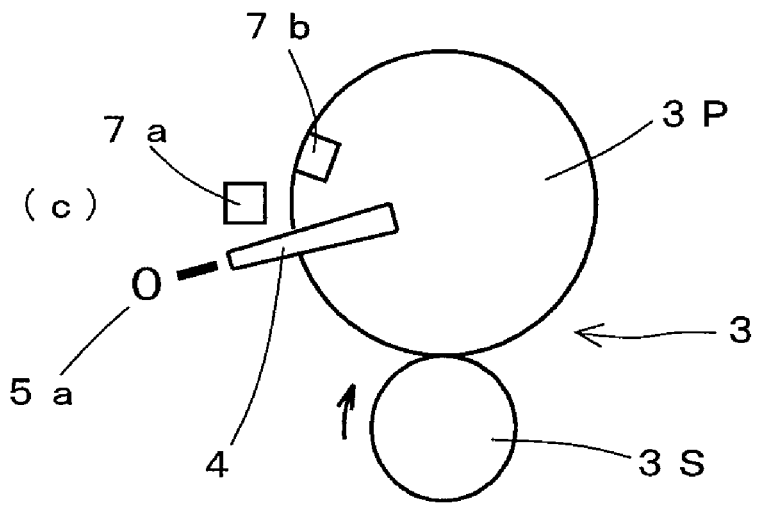
Figure 4:
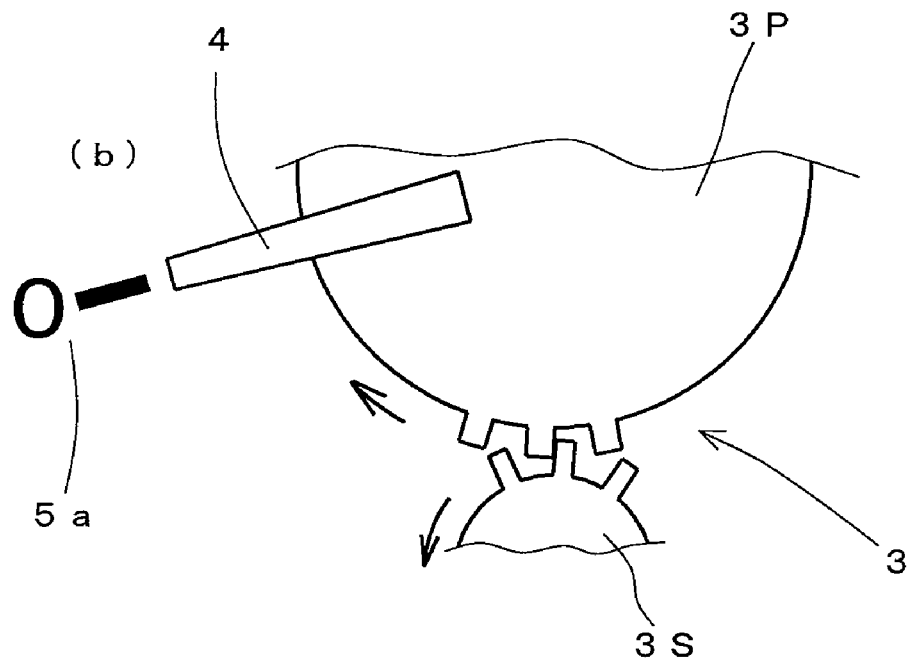
FIG. 4 includes another explanatory pictures showing the motion of a gear of the stepping motor and a gear of the pointer of FIG. 3.
Figure 4:
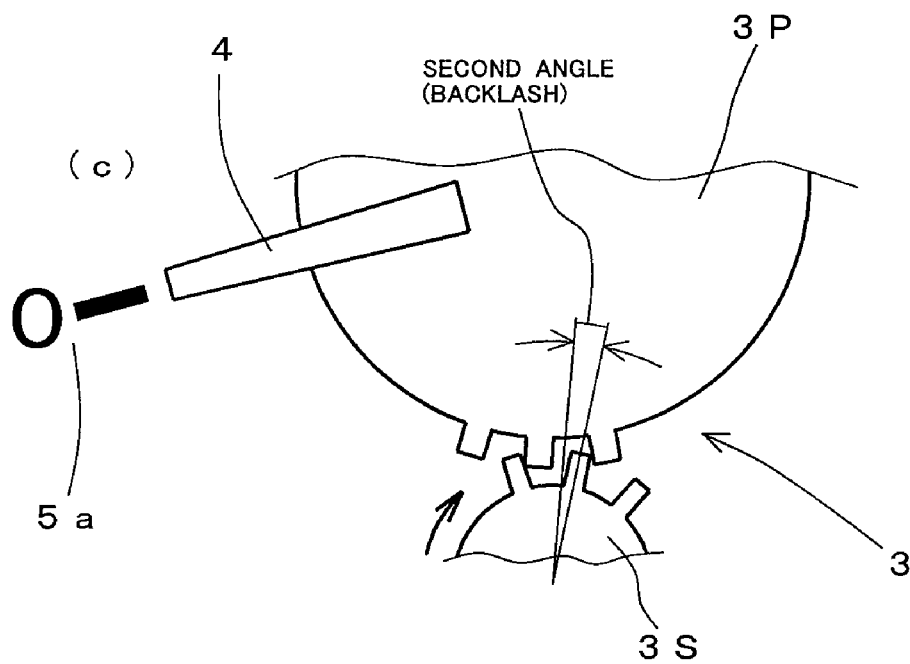
Figure 5:
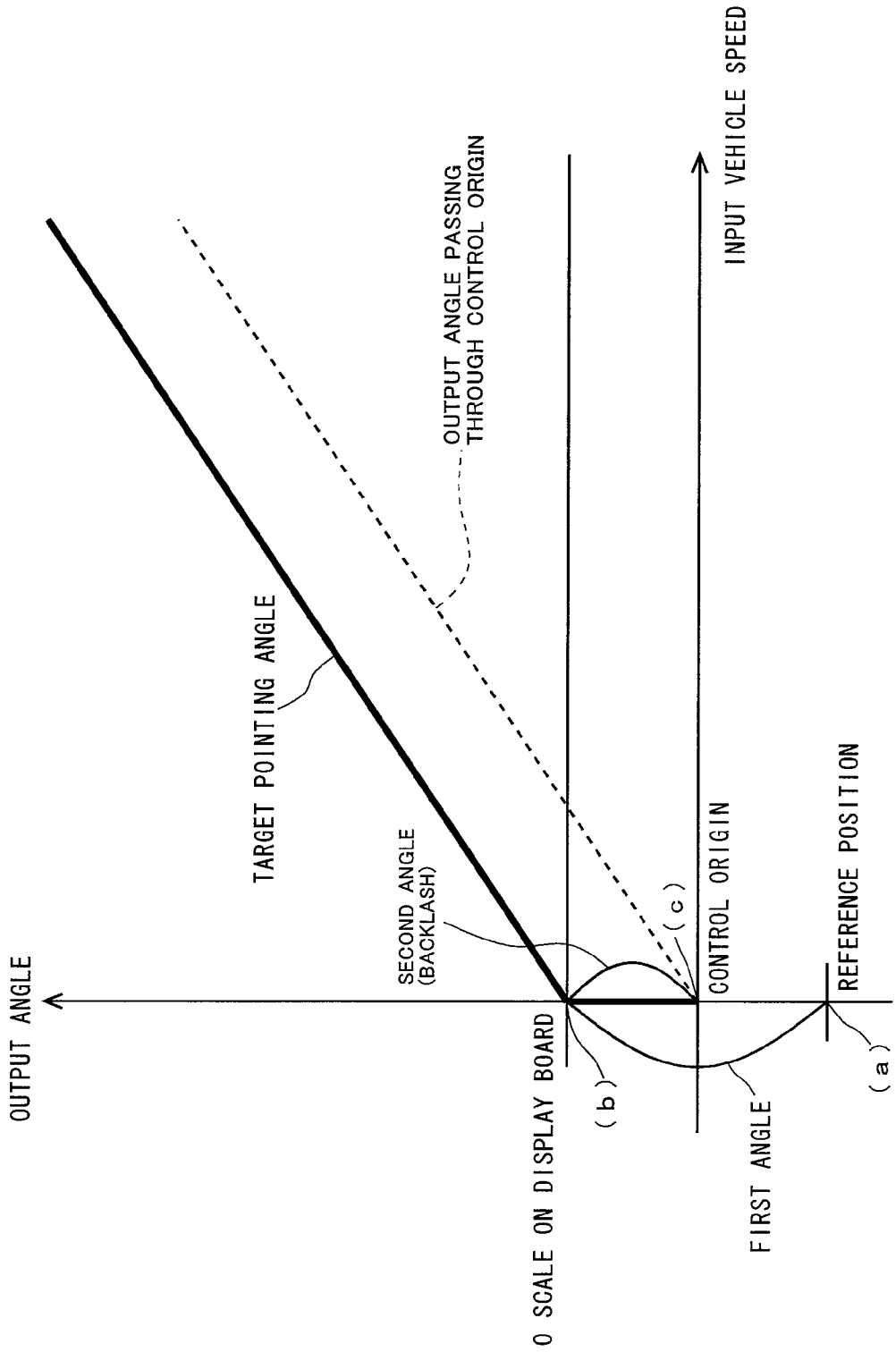
FIG. 5 includes an explanatory view showing a relationship of an input vehicle speed and an output angle of a gear of the stepping motor in the embodiment.

FIG. 2 shows drive process of the pointer 4, and FIGS. 3 and 4 show motions of the stepping motor 2 and the pointer 4 respectively. FIG. 5 shows a relationship between the input vehicle speed and the output angle of the gear 3S of the stepping motor 2.

The power is supplied to the control means 6 through operation of the ignition key switch 8 being the power switch 8. The control means 6 detects such supply of power, and starts the pointer drive process.

In step S1, the control means 6 receives measurement a measured signal of the input vehicle speed, and calculates an output angle based on the output angle data from the control origin, the data being corresponding to the input vehicle speed stored in the ROM 11.

In step S2, if the n data of the measured signal is zero which means the vehicle speed is zero, a backlash return flag is made to be 1. If the data of the measured signal is larger than zero, the backlash return flag is made to be 0.

In step S3, whether "0" scale pointing process, which is for pointing the "0" scale on the index section 5a of the display board 5 by the pointer 4, is completed is determined. When the "0" scale pointing process is completed, the process is advanced to step S4, and when it is not completed, the process is advanced to step S8. Since the zero detection process of the stepping motor 2 is typically not completed immediately after the power is supplied through operation of the power switch 8, determination is made as "NO", and the process is advanced to the step S8.

Here, for the convenience of description, the process of the step S8 is first described. In the step S8, the "0" scale pointing process is carried out. Regarding with this, the motion of the stepping motor 2 and the pointer 4 are described using FIGS. 3 and 4, and a relationship between the input vehicle speed and an output angle of the gear 3S of the stepping motor 2 is described using FIG. 5.

Immediately after the power is supplied, the control means 6 does not recognize which portion on the display board 5 is pointed by the pointer 4. Therefore, in order to recognize the position of the pointer 4, the control means 6 rotates the pointer 4 in a direction to the initial position. The rotation direction is unidirectional and the pointer 4 rotates counterclockwise in the embodiment.

The control means 6 drives the stepping motor 2 so that the gear 3S rotates clockwise described in FIG. 3(a). The rotation of the gear 3S causes the gear 3P that is fixed to the pointer 4 to rotate counterclockwise. The detection object 7b provided on the gear 3P rotates along with the rotation of the gear 3P. When the detection section 7a configuring the pointer reference-position setting means detects the detection object 7b provided on the gear 3P, the detection section 7a outputs a pointer reference-position arrival signal to the control means 6, and the control means 6 recognizes a reference position of the pointer 4 with the input of the arrival signal. Then, the control means 6 stops rotation of the pointer 4. The control means 6 performs the above first drive process.

Then, the control means 6 performs the second drive process where the pointer 4 is moved by the initial angle in a direction (clockwise direction) opposite to a reset-to-zero direction from the reference position so that the pointer 4 points "0" (zero pointing scale) on the index section 5a of the display board 5 (refer to FIG. 3b). This is the end of the "0" scale pointing process of the step S8. In this case, a position of the gear 3S of the stepping motor 2 corresponds to a position (b) in FIG. 5, which is not on the output angle passing through the control origin, and is on an angle given by adding an angle corresponding to a backlash to the output angle passing through the control origin.

Furthermore, in the step S3, the control mean 6 determines whether the "0" scale pointing process of the stepping motor 2 is completed. If the "0" scale pointing process is completed, the control mean 6 is carried out to step S4.

In the step S4, the control mean 6 determine whether the backlash return flag is 1 or 0. That is, when the data of a measurement signal of vehicle speed is 0, since the backlash return flag is 1, the process is advanced to step S7, and when the data of a measurement signal of the vehicle speed is larger greater than 0, since the backlash return flag is 0, the process is advanced to step S5. In most cases, the vehicle speed is typically 0 immediately after power is supplied. Therefore, processing is advanced to the step S7 for convenience of description.

In the step S7, the process is performed as follows. A position of the gear 3S of the stepping motor 2 corresponds to a position ((b) in FIG. 5), which is on an angle given by adding the angle corresponding to the backlash to the output angle data, passing through the control origin, corresponding to the measurement signal data. Therefore, the gear 3S of the stepping motor 2 is made to have a target output angle obtained by performing backlash return so that the position of the gear 3S corresponds to a position ((c) in FIG. 5) on the output angle data, passing through the control origin, corresponding to the measurement signal data.

After the process of the step S7 is completed, the process is then advanced to step S6, in which the control means 6 performs a generation process of a target pointing angle for pointing the index section 5a on the display board 5 based on the output pointing angle data corresponding to the measurement signal data, and outputs a signal of the target pointing angle to an output circuit to drive the stepping motor 2. The motion of the stepping motor 2 and the pointer 4 during performing such backlash return are described using FIGS. 3 and 4. FIGS. 3 and 4 are in such a relation that FIG. 4(b) is an expanded view of FIG. 3(b), and FIG. 4(c) is an expanded view of FIG. 3(c). The backlash return corresponds to the third drive process of the invention, in which only the gear 3S at the stepping motor 2 side of the speed-reduction mechanism 3 is moved by the second angle. In this case, a position of the gear 3S is shifted from (b) to (c) in FIG. 5. The second angle is corresponding to a backlash existing between a plurality of gears configuring the speed-reduction mechanism 3, and corresponds to the backlash between the gear 3S and the gear 3P in the embodiment.

Due to rotation of the gear 3S at the stepping motor 2 side, the pointer 4 is rotatable clockwise in a state of FIG. 4(b), but the pointer 4 is rotatable counterclockwise in a state of FIG. 4(c). As described before, the pointer 4 of the invention is made such that the gear 3P fixed with the pointer 4 is hardly rotated due to resistance of a guide member or the like unless it is driven by the stepping motor 2.

In the step S4, when a backlash return flag is determined to be 0, that is, when vehicle speed is not 0, the process is advanced to step S5.

In the step S5, the output angle data, passing through the control origin, corresponding to the measurement signal data is added with an angle corresponding to the backlash. Then, processing is advanced to step S6, in which the control means 6 performs generation processing of a target pointing angle for pointing the index section 5a on the display board 5, and outputs a signal of the target pointing angle to the output circuit to drive the stepping motor 2.

In the case that a vehicle runs and stops, when input vehicle speed is "0", the control means 6 performs processing of returning the gear 3S of the stepping motor 2 by the second angle, that is, by the angle corresponding to the backlash so that the gear 3S has the output angle passing through the control origin by performing the process of the step S7 in order to forcibly position the pointer 4 at the "0" scale position on the index section 5a of the display board 5.

In the embodiment, the reference position of the pointer 4 is set when the stepping motor 2 is powered on. However, the embodiment is not limitative, and the reference position of the pointer 4 may be set when the stepping motor 2 is powered off.

INDUSTRIAL APPLICABILITY

The invention is preferable for a pointer instrument that uses a stepping motor to measure and indicate measured quantity such as travel speed or engine speed for a vehicle based on frequency signal input in proportion to the measured quantity.

The invention claimed is:

1. A pointer instrument comprising:
    a stepping motor,
    a pointer driven by rotations of the stepping motor via a speed-reduction mechanism including a plurality of gears,
    a display board having an index section to be pointed by the pointer, and
    control means that drives and controls the stepping motor, wherein
    pointer reference-position setting means are provided for determining a reference position of the pointer, and
    when the stepping motor is powered on or off, the control means performs
    a first drive process where the pointer is rotated in a direction of the reference position, and the rotation of the pointer is stopped with an input of a pointer reference-position arrival signal from the pointer reference-position setting means,
    then performs a second drive process where the pointer is moved from the reference position by a first angle in a direction opposite to the reference position direction,
    and then performs a third drive process where a gear at a side of the stepping motor of the speed-reduction mechanism is moved by a second angle.

2. The pointer instrument according to claim 1, wherein the control means sets an angle corresponding to a backlash, existing between a plurality of gears (reduction gears) configuring the speed-reduction mechanism, as the second angle.

3. The pointer instrument according to claim 1, wherein the pointer reference-position setting means include a detection object for specifying a position of the pointer and a detection section that detects the detection object in a non-contact manner.

4. The pointer instrument according to claim 1, wherein a position of the pointer that has been stopped by the second drive process is set at a zero pointing scale on the display board.

5. The pointer instrument according to claim 4, wherein the control means is inputted with vehicle speed, and when the vehicle speed is zero, the control means forcibly positions the pointer at a position of the zero pointing scale.

* * * * *